June 11, 1963
M. H. STARK
3,093,287
MULTI-WALL FIBER CAN
Filed Aug. 30, 1961
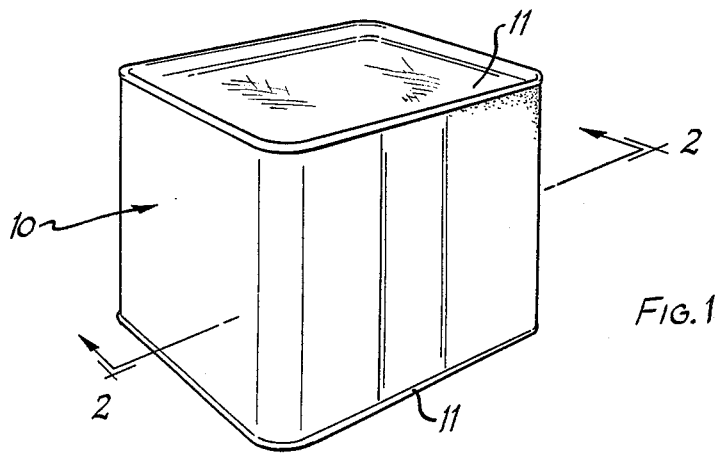
FIG. 1
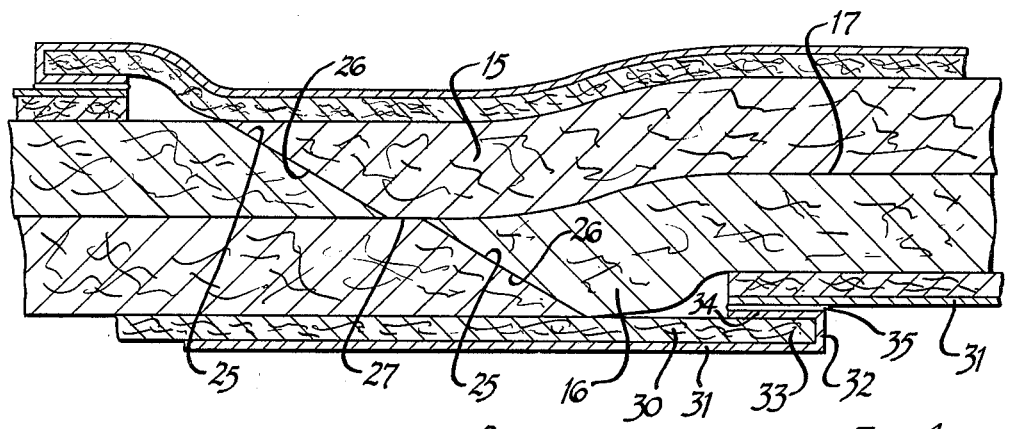
FIG. 4
FIG. 2
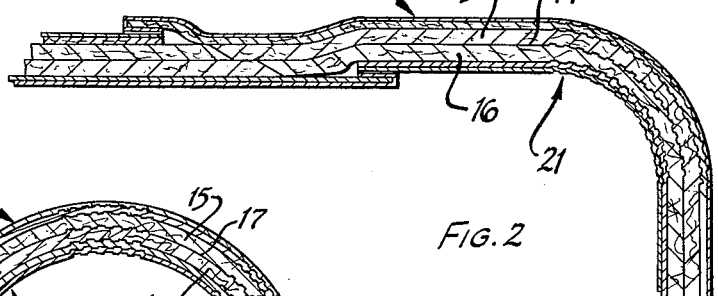
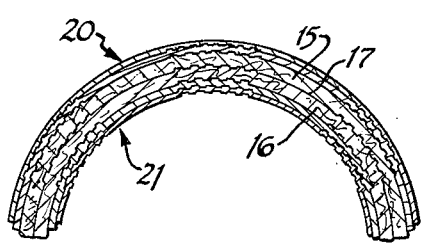
FIG. 3
INVENTOR.
MARTIN H. STARK
BY
WILSON, SETTLE & CRAIG
ATTORNEYS United States Patent Office
3,093,287
Patented June 11, 1963

3,093,287
MULTI-WALL FIBER CAN
Martin H. Stark, 223 N. Porter, Saginaw, Mich.
Filed Aug. 30, 1961, Ser. No. 135,044
1 Claim. (Cl. 229—3.1)

The present invention relates to a liquid-impervious fiber can body and more particularly to a can body of laminated multi-ply construction and provided with a fluid-impervious peripheral ply.

The present invention provides a fluid-impervious fiber can body by wrapping a laminated blank around a mandrel. Such a laminated blank includes a liquid barrier layer as either the exterior "wrapper" or "label" layer or the interior "liner" layer of the laminated blank. To provide a satisfactory can body, it is necessary to obtain a structurally strong, yet liquid tight joint or seam at the juncture of the ends of the plies.

The mere overlapping of the laminate ends results in an unsightly, bulky joint. The exposure of a fibrous edge at the periphery of the container, as beneath a liquid barrier lamina utilized as either a wrapper or liner, results in a "wicking" action affording a path for the entry of liquid into the fibrous main structural plies. Of course, any entry of liquid into the fibrous plies constituting the structural elements of the can body will result in the weakening and probable eventual destruction of the body.

The present invention now provides a new and improved liquid-impervious fiber can body formed as a laminated structure. The can body of the present invention has as one of its features the provision of a smooth "skived" joint at each of the main structural plies. Such a skived joint provides for the overlapping of the edges of each lamina without the formation of a bulky, conventional overlapped seam and further affords an elongated inclined joint which can be securely adhered. Further, the skived terminal ends of the main structural laminae are offset peripherally of the can body, so that a radial joint line running completely through the can body is avoided and the main structural joint is improved.

Secondly, the present invention provides a new and novel fluid-impervious laminae structure utilizing a fluid-impervious lamina secured in face-to-face abutment with a fibrous backing sheet, thereby strengthening the fluid barrier layer for the forming operation. Further, the impervious laminate is overlapped at the periphery of the can body to form an overlap joint, but without exposing a raw edge of the backing sheet. This is accomplished by covering one of the axial edges, actually the exposed edge, of the backing sheet with the fluid-impervious lamina and carrying this lamina covering the edge onto the reverse surface of the backing sheet. Thus, one axial edge of the backing sheet is completely encased, and this edge becomes the exposed edge of the fluid-impervious reinforced laminae. That portion of the fluid-impervious lamina on the reverse surface of the backing sheet and adjacent the covered edge thereof is adhered to the opposite marginal portion of the corresponding lamina overlapped at the joint by suitable means, as by an adhesive or by heat sealing. Thus, a fluid-impervious joint is provided, and no fibrous edge is exposed for any possible "wicking" action.

It is, therefore, an important object of the present invention to provide a new and improved fluid-impervious fibrous can body.

It is another important object of this invention to provide an improved fibrous can body having a joint of increased strength, of liquid-impervious character and of enhanced appearance.

Another object of this invention is the provision of a fibrous can body in which the periphery of the can body is covered by a liquid-impervious layer laminated to a fibrous backing sheet and constructed so that a liquid-impervious joint is provided.

It is a further, and no less important, object of the present invention to provide an improved laminated fiber can body wherein a plurality of main structural fibrous laminae are secured to the configuration of the can body by self-abutting, skived edges adhesively secured to one another, the skived edges of adjacent laminae being peripherally offset to avoid radial weakening of the body.

It is still another important object of this invention to provide an improved fiber can body including a plurality of laminae including a plurality of main structural fibrous laminae secured together by offset skived, self-abutting edges and a peripheral layer including a backing sheet and a fluid-impervious lamina, the lamina completely covering the exposed edge of the backing sheet and oriented to provide a completely fluid-impervious seam.

Other objects of this invention will appear in the following description and appended claim, reference being had to the accompanying drawings, forming a part of this specification wherein like reference characters designate corresponding parts in the several views.

On the drawings:

FIGURE 1 is an elevational perspective view of a fiber can incorporating a body of the present invention;

FIGURE 2 is an enlarged fragmentary sectional view taken along the plane 2—2 of FIGURE 1;

FIGURE 3 is a view similar to FIGURE 2 but illustrating a cylindrical can body;

FIGURE 4 is a greatly enlarged sectional view of the can body joint.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURE 1, reference numeral 10 refers generally to a rectangular fibrous can body formed, as hereafter described in greater detail, by the lamination of a plurality of fibrous lamina and at least one fluid-impervious lamina. The open axial ends of the can 10 are closed by conventional metallic or fibrous end caps 11 which are clinched or "seamed" onto the ends of the body.

As best illustrated in FIGURE 2 of the drawings, the fibrous can body 10 includes a plurality of main, structural fibrous plies 15 and 16 which are laminated together and adhesively secured at their abutting faces 17. Laminated to the exterior surface of the outer main structural fibrous ply 15 is an outer "wrapper" or peripheral laminate indicated generally at 20 and hereinafter more fully described. Secured to the inner face of the inner ply 16 is a "liner" or inner peripheral laminate 21. These laminates 20 and 21 constitute the liquid-impervious peripheral layers of the laminated assembly.

While the assembly of FIGURE 2 utilizes both the exterior laminate 20 and the interior laminate 21, it will be readily appreciated that either such laminate may be utilized alone or in conjunction with the main structural fibrous plies 15 and 16.

It will be appreciated that the main structural fibrous plies 15 and 16 are of substantial thickness, preferably on the order of from 0.025 to 0.050 inch in thickness, and that some difficulty may be encountered in wrapping the composite 0.10 paper board thickness about the mandrel during formation of the body. Further, it will be appreciated that during such wrapping a greater length of material is required in the outer lamina 15 than in the inner lamina 16, because of the different peripheral distances required to be traversed. Additionally, in so wrapping a laminated structure about the forming mandrel, unsightly wrinkling of the laminae at the corners may occur.

Accordingly, it is preferred that the fibrous laminae be individually creased prior to their being adhesively secured into the laminated, multi-thickness structure. Further, to accommodate the different distances traversed by the different layers in the laminated structure, it is preferred that the laminae be creased to differing extents in accordance with their location in the final laminated structure. The manner in which such creasing can be performed is fully disclosed in my copending application Serial No. 133,006, filed June 27, 1961, now Patent No. 3,064,544 of November 20, 1962.

The extent of creasing of the laminae relative to one another can be varied by varying either the depth of creasing or the number of creases in the different laminae. Further, in the event that a smooth interior surface is desired, the outer laminae are creased to a gretater extent than the inner laminae so that any accumulation of material occurs at the exterior of the composite structure. In the event that a smooth exterior contour is desired, the inner laminae are creased to a greater extent so that material is gathered at the inner periphery and a smooth outer periphery is provided.

In the formation of a generally rectangular final structure as illustrated in FIGURES 1 and 2 of the drawings, the locations of the creases correspond to the locations of the corners in the final structure. In the event that a cylindrical can body is desired, as illustrated in FIGURE 3 of the drawings, the creasing occurs at peripherally spaced locations, the number of creasing locations depending upon the thickness of the composite or laminated body and the periphery of the mandrel upon which the composite body is convolutely wrapped during formation of the body.

Considering now the joint illustrated in detail in FIGURE 4 of the drawings, it will be appreciated that this joint is applicable to either the polygonal construction of FIGURES 1 or 2 of the drawings or the cylindrical configuration illustrated in FIGURE 3 of the drawings.

In either event, in wrapping the composite structure about the mandrel, the respective ends of the lamina 15 are brought into abutment, the lamina ends being skived as at 25, 26 and abutted with one another with a layer of adhesive interposed therebetween. Further, it will be noted that the skived surfaces 25, 26 of the laminae 15 and 16 are offset peripherally of the can body, as at 27. By thus offsetting the skived edges, there is no single radial plane along which the joint can be readily ruptured.

Considering now the liquid-impervious laminae 20 and 21, it will be observed that these laminae are identical and each includes a fibrous lamina 30 forming a backing sheet to one surface of which there is adhered, in face-to-face relationship, a liquid-impervious lamina 31. The lamina 31, which is impervious to liquids, such as water and/or greases can be either metallic foil, i.e., aluminum foil; or a plastic film, such as polyethylene, a vinyl polymer or copolymer, "Saran," nylon, or a polyester; or a fibrous film, such as parchment or glassine paper.

It will be noted that the lamina 31 extends, as at 32, around one edge 33 of the fibrous lamina 30, the lamina 31 then extending, as at 33, along the reverse surface of the fibrous sheet 30. Thus, the edge 33 of the fibrous backing sheet 30 is completely encased in the liquid-impervious lamina 31. Further, the portion 33 on the reverse side of the sheet 30 is preferably of substantially the same extent as the extent of overlapping of the ends of the assembly of the lamina 30 and 31, and this portion 33 is secured to the other marginal edge of the lamina 31 by suitable means, as by an adhesive 35 or by heat sealing.

Thus, it will be readily apparent that the present invention provides a new and novel multi-thickness fiber can body construction. The enhanced strength of the skived joints in the main structural plies 15 and 16 will be readily appreciated, such strength being materially aided by the peripheral offsetting of the lines of juncture, as at 27, to avoid any single radial line of fracture. Also, it will be noted that the overlapped joints of the peripheral laminates are offset from the skived joints.

Further, the improved liquid-impervious joint provided at the liner lamina 31 wil lbe readily apreciated. The complete investing of the edge 33 by the liquid-impervious portions 31, 32 and 33 protect the edge against any possible "wicking" of liquid into the fibrous backing sheet 30. At the same time, the backing sheet, preferably on the order of 0.010 inch in thickness, provides a readily registrable edge for the lamina 31, thus promoting easy formation of the laminated structure by merely wrapping the same about the forming mandrel. Further, the waterproof and greaseproof joint provided at the overlapping portions of the liquid-impervious peripheral laminae will be readily apreciated.

This joint is important whether the liquid-impervious peripheral laminae are provided at the inner periphery of the can body, as is required in the packaging of liquid ingredients, or whether the liquid-impervious laminae are provided at the outer periphery of the body, as is required in the use of labels for cans subjected to conditions of high humidity, as in a freezing compartment or the like, or whether both inner and outer laminae are utilized as illustrated in the drawings. If desired, the outer laminae may be printed or lithographed to serve as a label.

Additionally, the improved forming characteristics and the smooth peripheral surface made possible by the creasing of at least the main structural plies 15 and 16 will also be readily appreciated. If desired, the liquid-impervious laminae 20 and 21 may also be creased, although such creasing may not be required in view of the relatively thin sheet stock utilized for these laminae.

Having thus described my invention, I claim:

A fluid-impervious can body comprising a plurality of peripheral fibrous plies laminated in face-to-face assembly and having self-abutting skived edges offset radially of the body so that none of the edges are aligned with any other edge, the self-abutting skived edges being adhesively secured to one another, and an inner ply comprising a water-impervious liner secured to a fibrous backing sheet, the fibrous backing sheet being laminated to the inner one of the peripheral plies, the inner ply having an overlap joint in which one axial edge of the inner ply overlaps the other axial edge thereof, and the liner covering the entire inner surface of the backing sheet, the exposed axial edge thereof and that portion of the backing sheet opposite the inner surface adjacent the exposed axial edge and overlapping the other edge of the inner ply, and means adhesively securing to one another the overlapped liner-covered edges of the inner ply to form a fluid-impervious liner-to-liner joint.

References Cited in the file of this patent

UNITED STATES PATENTS

| | | |
|---|---|---|
| 1,885,587 | Burton | Nov. 1, 1932 |
| 2,120,900 | Moore | June 14, 1938 |
| 2,130,355 | Magill | Sept. 20, 1938 |
| 2,237,809 | Bronson | Apr. 8, 1941 |
| 2,278,502 | Waters | Apr. 7, 1942 |
| 2,393,347 | Stuart | June 22, 1946 |
| 2,415,323 | Wilcox | Feb. 4, 1947 |